United States Patent
Hanenburg

(10) Patent No.: US 9,680,282 B2
(45) Date of Patent: Jun. 13, 2017

(54) LASER AIMING FOR MOBILE DEVICES

(71) Applicant: Hand Held Products, Inc., Fort Mill, SC (US)

(72) Inventor: Hidde Arjen Hanenburg, Everett, WA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/943,402

(22) Filed: Nov. 17, 2015

(65) Prior Publication Data

US 2017/0141528 A1    May 18, 2017

(51) Int. Cl.
  *H01S 3/10*   (2006.01)
  *H01S 3/00*   (2006.01)
  *H05B 3/02*   (2006.01)
  *G06K 7/10*   (2006.01)
  *H05B 37/02*  (2006.01)

(52) U.S. Cl.
  CPC .............. *H01S 3/10* (2013.01); *H01S 3/0014* (2013.01); *H05B 37/02* (2013.01)

(58) Field of Classification Search
  CPC ......... H01S 3/10; H01S 3/0014; H05B 37/02; H05B 37/0218
  USPC ....................................................... 315/149
  See application file for complete search history.

(56) References Cited

U.S. PATENT DOCUMENTS

| | | |
|---|---|---|
| 6,832,725 B2 | 12/2004 | Gardiner et al. |
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |

(Continued)

FOREIGN PATENT DOCUMENTS

| | | |
|---|---|---|
| WO | 2013163789 A1 | 11/2013 |
| WO | 2013173985 A1 | 11/2013 |

(Continued)

OTHER PUBLICATIONS

U.S. Appl. No. 13/367,978, filed Feb. 7, 2012, (Feng et al.); now abandoned.

(Continued)

*Primary Examiner* — Dylan White
(74) *Attorney, Agent, or Firm* — Additon, Higgins & Pendleton, P.A.

(57) ABSTRACT

Aiming a device at a target within a use environment is described. An intensity level of ambient lighting associated with the use environment is detected and a corresponding signal is generated. An emission of a beam operable for the aiming of the device is controlled. Upon the generated signal corresponding to a first detected ambient lighting intensity level, a first laser is activated to emit the aiming beam at a first power intensity level. Upon the generated signal corresponding to a second detected ambient lighting intensity level, which exceeds the second detected ambient lighting intensity level, a second laser is activated to emit the aiming beam at a second power intensity level. The first power intensity level exceeds the second power intensity level.

18 Claims, 9 Drawing Sheets

(56) References Cited

U.S. PATENT DOCUMENTS

| | | |
|---|---|---|
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |

(56) References Cited

U.S. PATENT DOCUMENTS

| | | |
|---|---|---|
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey et al. |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| 2007/0063048 A1 | 3/2007 | Havens et al. |
| 2009/0084851 A1* | 4/2009 | Vinogradov ............. G06K 7/14 235/462.21 |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0006895 A1* | 1/2012 | Vinogradov ....... G06K 7/10792 235/462.21 |
| 2012/0111946 A1 | 5/2012 | Golant |
| 2012/0120973 A1* | 5/2012 | Ziemkowski .......... A63G 33/00 372/29.02 |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |

(56) References Cited

U.S. PATENT DOCUMENTS

| | | |
|---|---|---|
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346232 A1* | 11/2014 | Giebel ............... G06K 7/10831 235/462.06 |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz, Sr. et al. |
| 2016/0314294 A1 | 10/2016 | Kubler et al. |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

(56) References Cited

OTHER PUBLICATIONS

U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.
U.S. Appl. No. 14/715,916 for Evaluating Image Values filed May 19, 2015 (Ackley); 60 pages.
U.S. Appl. No. 29/525,068 for Tablet Computer With Removable Scanning Device filed Apr 27, 2015 (Schulte et al.); 19 pages.
U.S. Appl. No. 29/468,118 for an Electronic Device Case, filed Sep. 26, 2013 (Oberpriller et al.); 14 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et. al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User's Nervous System filed Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Bamdringa); 38 pages.
U.S. Appl. No. 14/740,373 for Calibrating a Volume Dimensioner filed Jun. 16, 2015 (Ackley et al.); 63 pages.
Intermec, "Product Profile, IP30, Handheld RFID Reader", 2 pages, dated Feb. 2014.
Intermec, "Product Profile, CK71, Ultra-rugged Mobile Computer", 3 pages, dated Jun. 2012.

\* cited by examiner

EXAMPLE AIMING PROCESS
60

DETECT AN INTENSITY LEVEL OF AMBIENT LIGHTING
ASSOCIATED WITH A USE ENVIRONMENT OF THE DEVICE
61

GENERATE A SIGNAL CORRESPONDING TO THE
DETECTED AMBIENT LIGHTING INTENSITY LEVEL
62

CONTROL AN EMISSION OF A BEAM OPERABLE FOR THE
AIMING OF THE DEVICE
63

FIG. 6A

LASER AIMING FOR MOBILE DEVICES

TECHNOLOGY FIELD

The present invention relates generally to data collection. More particularly, example embodiments of the present invention relate to aiming devices in relation to data collection operations.

BACKGROUND

Generally speaking, contemporary handheld and mobile computing devices ("mobile devices") may be operable in uses relating to Automatic Identification & Data Capture (AIDC). For example, a portable data terminal (PDT) or other mobile device may be operable for scanning radio frequency identification (RFID) tags and/or graphic data patterns such as bar codes. The AIDC is used in logistics, shipping, cargo handling and transport, commerce, security, and various other endeavors.

In view of the various endeavors in which it is used, the mobile devices may be operable for performing the AIDC in more than one environment. For example, the mobile devices may be tasked to operate in relation to the AIDC within an indoor use environment, or within an outdoor use environment. Ambient characteristics of the outdoor environment, such as an ambient lighting intensity level, may contrast significantly from the ambient characteristics of the outdoor use environment.

The performance of an AIDC operation may involve aiming the mobile device at a scan target. The aiming allows the mobile device to be aligned for directing illuminating and/or triggering energy at the scan target. The aiming also allows the mobile device to be aligned for a sensing a reflection of the illumination (e.g., in scanning barcodes), or a responsively triggered emission (e.g., in scanning RFID tags). The aiming may be performed by a laser associated with the mobile device.

An operator may aim the mobile device by directing a visible linear light beam emitted by the laser at the scan target. The mobile device is aligned with the scan target based on the operator's observation of a reflection of the illumination of the scan target by the laser beam directed thereto. The scan of the target by the mobile device may be triggered upon observing the reflection of the laser beam directed thereto. The observation of the reflection of the laser beam from the target relates to its perceptibility.

The perceptibility of the laser beam reflection from the scan target to the operator relates to multiple factors. Assuming operators to have visual acuity and ocular health sufficient to sustain their related occupational activity, the visibility factors include the brightness of the laser beam, the reflectivity of a surface of the scan target, and the brightness of ambient lighting in which the aiming is performed. The ambient lighting brightness relates to the use environment.

Reflections of laser beams emitted at a given power intensity level over one or more visible wavelengths, from targets with similar surface reflectance values, may be more perceivable by the operators when observed under lower ambient lighting intensity levels than when observed under higher ambient lighting intensity levels. Aiming the mobile device with the laser within the indoor use environment may sometimes thus be easier, more efficient, or quicker than with outdoor uses.

A laser associated with the mobile device may illuminate the scan target at a power intensity level sufficient perceptibly for aiming the devices within the relatively low ambient lighting intensity levels typically characterizing indoor use environments. Target illumination sufficient for efficient aiming at higher ambient lighting intensity levels, for example, characterizing daytime outdoor use environments, may be provided by lasers with a significantly higher power intensity levels. The higher power lasers, however, may present optical radiation hazards to the operator and others when used to aim the mobile devices in the indoor use environments.

It could be useful, therefore, to conduct AIDC operations over scan targets efficiently mobile devices in various use environments. It could also thus be useful, in relation to the AIDC operations, to aim the mobile devices with a laser in each of the various use environments, whether indoor or outdoor, and under differing ambient lighting conditions associated each therewith. Further, it could be useful to provide for the perceptibility of the laser beam, with which the mobile device is aimed in relation to the AIDC operations, safely.

SUMMARY

Accordingly, in one aspect, an example embodiment of the present invention relates to conducting AIDC operations over scan targets efficiently with mobile devices used in various environments. In relation to the AIDC operations, the example embodiments aim the mobile devices with a laser in each of the various use environments, whether indoor or outdoor, and under differing ambient lighting conditions associated each therewith. Further, example embodiments provide for the perceptibility of the laser beams, with which the mobile device is aimed in relation to the AIDC operations, safely. Example embodiments of the present invention relate to systems and methods for aiming a device at a target within a use environment.

An example embodiment of the present invention relates to a method for aiming a device at a target within a use environment. An intensity level of ambient lighting associated with the use environment is detected and a corresponding signal is generated. An emission of a beam operable for the aiming of the device is controlled. Upon the generated signal corresponding to a first detected ambient lighting intensity level, a first laser is activated to emit the aiming beam at a first power intensity level. Upon the generated signal corresponding to a second detected ambient lighting intensity level, which exceeds the second detected ambient lighting intensity level, a second laser is activated to emit the aiming beam at a second power intensity level. The first power intensity level exceeds the second power intensity level.

An example embodiment of the present invention relates to a system for aiming a device at a target within a use environment. The system may be operable for performing an aiming process, such as the method described herein.

An example embodiment of the present invention relates to a non-transitory computer-readable storage medium. The storage medium comprises instructions. When executed by one or more processors, the instructions are operable for causing, configuring, controlling, or programming a process for aiming a device at a target within a use environment, such as the method described herein.

The foregoing illustrative summary, as well as other example features, functions and/or aspects of embodiments of the invention, and the manner in which the same are accomplished, are further explained within the following detailed description of example embodiments and each figure ("FIG.") of the accompanying drawings.

BRIEF DESCRIPTION OF THE DRAWINGS

FIG. 6A depicts a flowchart of an example process for aiming a device at a target within a use environment, according to an embodiment of the present invention;

DESCRIPTION OF EXAMPLE EMBODIMENTS

Figure 1:
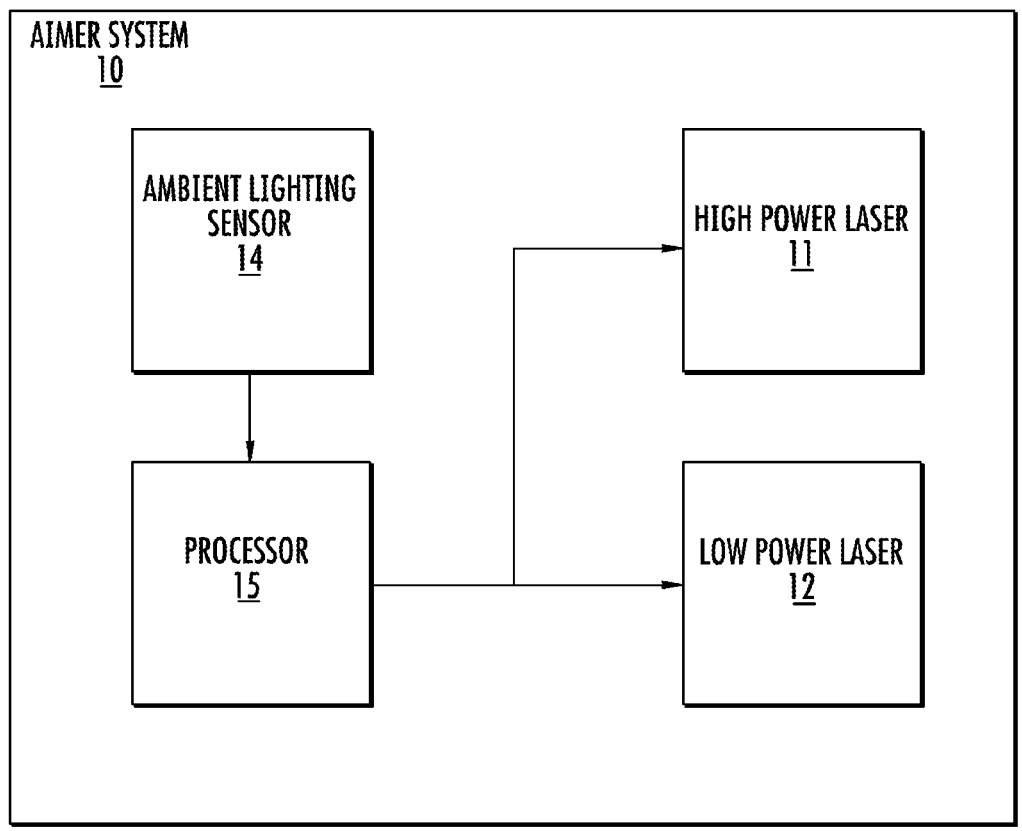
FIG. 1 depicts an example system for aiming a device at a target within a use environment, according to an embodiment of the present invention.

Example embodiments of the present invention are described in relation to systems and methods for aiming a device at a target within a use environment. An intensity level of ambient lighting associated with the use environment is detected and a corresponding signal is generated. An emission of a beam operable for the aiming of the device is controlled. Upon the generated signal corresponding to a first detected ambient lighting intensity level, a first laser is activated to emit the aiming beam at a first power intensity level. Upon the generated signal corresponding to a second detected ambient lighting intensity level, which exceeds the second detected ambient lighting intensity level, a second laser is activated to emit the aiming beam at a second power intensity level. The first power intensity level exceeds the second power intensity level.

Overview.

Example embodiments of the present invention relate to systems and methods for aiming a device at a target within a use environment.

An example embodiment of the present invention relates to a method for aiming a device at a target within a use environment. The method comprises detecting an intensity level of ambient lighting associated with the use environment. A signal is generated corresponding to the detected ambient lighting intensity level. An emission of a beam operable for the aiming of the device is controlled. Upon the generated signal corresponding to a first detected ambient lighting intensity level, the controlling of the emission comprises activating a first laser to emit the aiming beam at a first power intensity level. Upon the generated signal corresponding to a second detected ambient lighting intensity level, wherein the first detected ambient lighting intensity level exceeds the second detected ambient lighting intensity level, the controlling of the emission comprises activating a second laser to emit the aiming beam at a second power intensity level. The first power intensity level exceeds the second power intensity level.

The use environment may comprise an outdoor setting, in which the first detected ambient lighting intensity level corresponds to the outdoor setting. The use environment may comprise an indoor setting, in which the second detected ambient lighting intensity level corresponds to the indoor setting.

The detection of the intensity level may comprise measuring an intensity value characterizing the detected intensity level of the ambient lighting associated with the use environment. The detection of the intensity level may further comprise comparing the measured intensity level with a programmed and/or predetermined threshold value.

Based on the comparison of the measured intensity level, the detection of the intensity level may further comprise determining that the measured intensity level exceeds the programmed and/or predetermined threshold value. Based on the comparison of the measured intensity level, the detection of the intensity level may further comprise determining that the programmed and/or predetermined threshold exceeds the value of the measured intensity level.

An example embodiment of the present invention relates to a non-transitory computer-readable storage medium comprising instructions, which when executed by one or more processors causes, configures, controls, or programs a method for aiming a device at a target within a use environment, the aiming method described herein.

An example embodiment of the present invention relates to a system for aiming a device disposed in a use environment. The system comprises a sensor operable for detecting an intensity level of ambient lighting associated with the use environment, and for generating a signal corresponding to the detected ambient lighting intensity level. The system also comprises a first laser and a second laser.

The first laser is operable for emitting a first aiming beam. The first aiming beam comprises a first power intensity level. The second laser is operable for emitting a second aiming beam. The second aiming beam comprises a second power intensity level. The first power intensity level exceeds the second power intensity level.

Further, the system comprises a processor operable for responding to the generated signal. Upon the generated signal corresponding to a first detected ambient lighting intensity level, the processor activates the first laser to emit the first aiming beam. Upon the generated signal corresponding to a second detected ambient lighting intensity level, wherein the first detected ambient lighting intensity level exceeds the second detected ambient lighting intensity level, the processor activates the second laser to emit the second aiming beam.

The use environment may comprise an outdoor setting, or an indoor setting. The first detected ambient lighting intensity level corresponds to the outdoor setting. The second detected ambient lighting intensity level corresponds to the indoor setting.

The detection of the intensity level may comprise measuring an intensity value characterizing the detected intensity level of the ambient lighting associated with the use environment. The detection of the intensity level further comprises comparing the measured intensity level with a programmed and/or predetermined threshold value. The detection of the intensity level of the ambient lighting level may be based on the comparison of the measured intensity level with the threshold value.

It may be determined that the measured intensity level exceeds the programmed and/or predetermined threshold value. It may be (e.g., alternatively) determined that the programmed and/or predetermined threshold value exceeds the measured intensity level.

An example embodiment may be implemented in which the second laser comprises a Class 2 classification under the 'IEC 60825-1' Standard of the International Electrotechnical Commission (IEC) standards authority. The second laser power level thus comprises one Milliwatt (1 mW) or less, continuous wave (CW), at one or more wavelengths disposed over the range of 400 to 700 nanometers (400-700 nm), inclusive. The first power intensity level of the first laser exceeds a maximum power intensity value specified for compliance with the Class classification under the 'IEC 60825-1' Standard. For example, the first power intensity level of the first laser may exceed a maximum power intensity value of 1 mW, CW, at one or more wavelengths disposed over the range of 400-700 nm, inclusive.

The device aimed by the system and disposed in the use environment comprises the mobile computing device. In an example embodiment, the system further comprises the mobile device, and a 'laser' platform coupled communicatively with the mobile device and comprising the first laser. The second laser may comprise a component of the mobile device, or the laser platform.

The mobile device comprises one or more applications operable for performing at least one AIDC related function. The AIDC related function may comprise scanning and reading radio frequency identification (RFID) tags and/or one dimensional (1D) data patterns such as "barcodes," and/or two dimensional (2D) data patterns, such as 'Quick Response' (QR) and/or 'Han Xin' matrices.

Example embodiments of the present invention thus provide for conducting AIDC operations with mobile devices efficiently on scan targets in various use environments. In relation to the AIDC operations, the example embodiments aim the mobile devices with a laser in each of the various use environments, whether indoor or outdoor, and under differing ambient lighting intensity conditions associated each therewith. Further, example embodiments provide for the perceptibility of the laser beams, with which the mobile device is aimed in relation to the AIDC operations, safely.

An example embodiment of the present invention is described in relation to a system for aiming a device at a target within a use environment.

Example System.

FIG. 1 depicts an example system 10 for aiming a device at a target within a use environment, according to an embodiment of the present invention. The system 10 comprises a first laser 11, a second laser 12, an ambient lighting sensor 14, and a processor 15.

The sensor 14 is operable for detecting an intensity level of ambient lighting associated with the environment in which the aiming system is used. The sensor 14 generates a signal corresponding to the detected ambient lighting intensity level.

The first laser 11 is operable for emitting a first aiming laser beam. The first aiming beam comprises a first power intensity level. The second laser 12 is operable for emitting a second aiming laser beam. The second aiming beam comprises a second power intensity level. The first power intensity level exceeds the second power intensity level.

The first laser 11 may thus comprise a high power output, relative to the output of the second laser 12. The second laser 12 may thus comprise a low power output, relative to the first laser 11. As used herein, the term "power output" relates to optical power in relation to the brightness of the laser beams emitted by each of the lasers, and corresponding intensity levels. The first laser 11 may be referred to herein as a "high power laser," and the second laser 12 may be referred to as a "low power laser."

An example embodiment may be implemented in which the second laser comprises a Class 2 classification under the IEC 60825-1 Standard. The second laser power level thus comprises one Milliwatt (1 mW) or less, CW, at one or more wavelengths disposed over the range 400-700 nm, inclusive. The first power intensity level of the first laser exceeds a maximum power intensity value specified for compliance with the Class 2 classification under the IEC 60825-1 Standard. For example, the first power intensity level of the first laser may exceed a maximum power intensity value of 1 mW, CW, at one or more wavelengths disposed over the range of 400-700 nm, inclusive.

The processor 15 is operable for responding to the signal corresponding to the detected ambient lighting intensity level signal, generated by the ambient light sensor 14. In response to the ambient lighting intensity level signal, the processor 15 is operable for controlling the high power laser 11 and the low power laser 12.

Upon the generated signal corresponding to a first detected ambient lighting intensity level, the processor 15 activates the first, high power laser 11 to emit the first aiming laser beam. Upon the generated signal corresponding to a second detected ambient lighting intensity level, wherein the first detected ambient lighting intensity level exceeds the second detected ambient lighting intensity level, the processor 15 activates the second, low power laser 12 to emit the second aiming laser beam.

Figure 2:
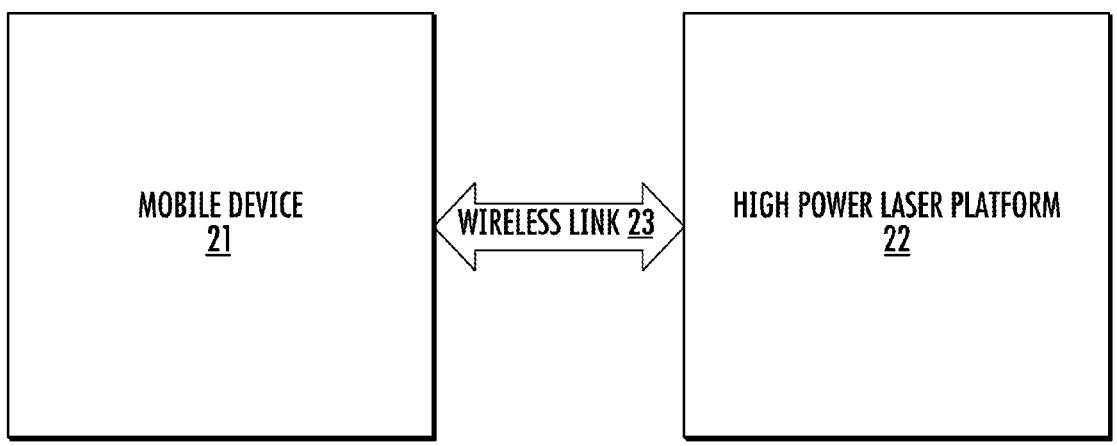
FIG. 2 depicts an example configuration for the aiming system, according to an embodiment of the present invention.

The aiming system 10 may comprise a configuration in which it is disposed over at least two components. FIG. 2 depicts an example configuration 20 for the aiming system 10, according to an embodiment of the present invention. In the configuration 20, the aiming system 10 comprises a mobile device 21, and a high power laser platform 22. The high power laser 11 is disposed with the high power laser platform 22. The high power laser platform is coupled communicatively by a link 23. The link 23 may comprise a wireless link operable over a radio frequency (RF).

The RF link 23 may comprise a Bluetooth radio link, operable over one or more frequencies in the Instrumentation, Scientific and Medical (ISM) band of the RF spectrum between approximately 2.4 Gigahertz (GHz) and 2.485 GHz, inclusive. The Bluetooth link 23 may comprise a Bluetooth Low Energy (BLE) wireless connection.

The BLE 23 is operable for transmitting control signals between the mobile device 21 and the high power laser platform 22. The control signals transmitted by the mobile device 21 are operable for, selectively, enabling and disabling operability of the high power laser 11 response of the processor 15 to the ambient lighting intensity signal generated by the ambient lighting level sensor 14. The high power laser platform 22 may thus be activated and deactivated, accordingly, by the mobile device 21.

Figure 3:
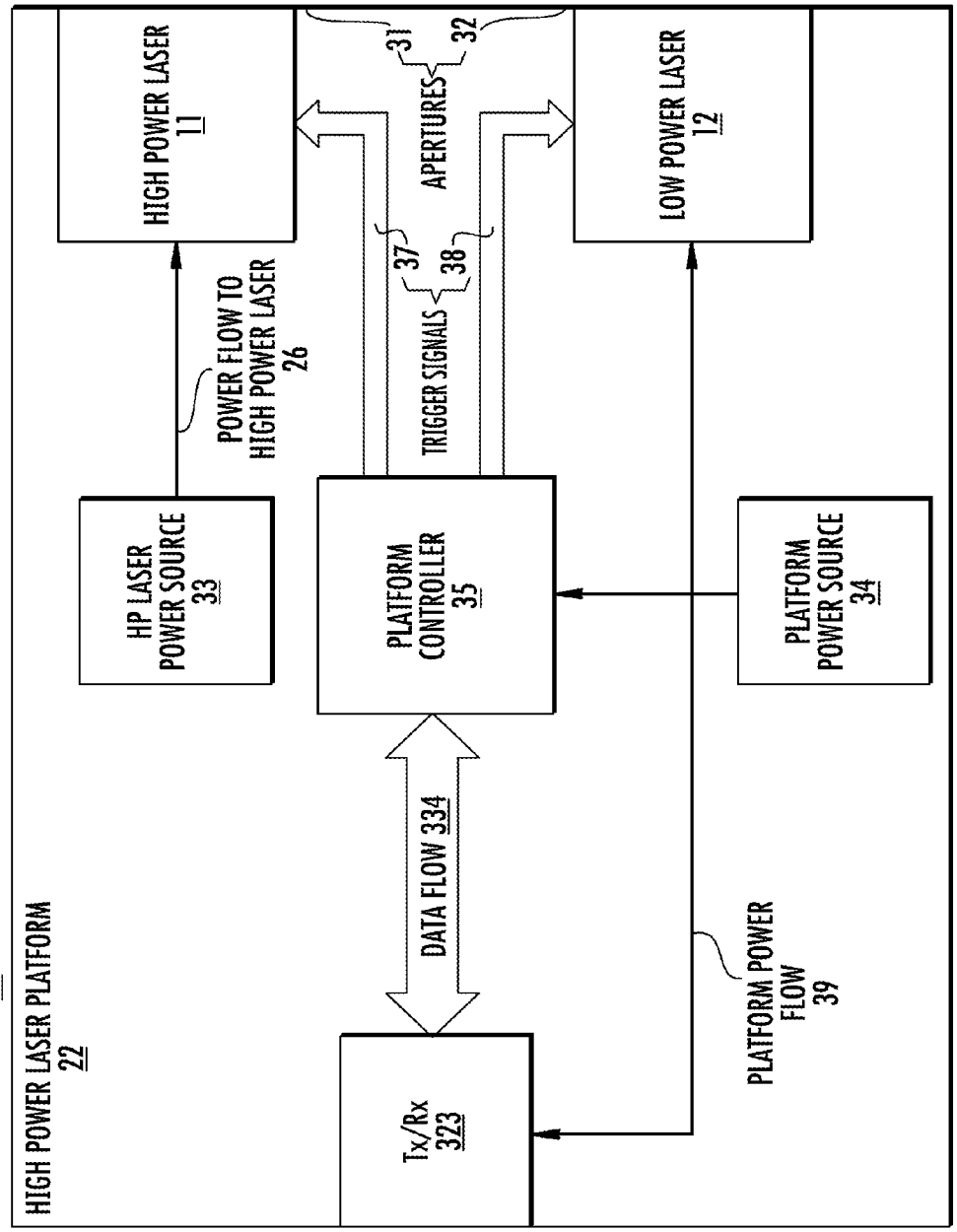
FIG. 3 depicts an example high power laser platform, according to an embodiment of the present invention.

FIG. 3 depicts an example high power laser platform 22, according to an embodiment of the present invention. The platform 22 comprises a transmitter/receiver, or "transceiver" ("Tx/Rx") device 323. The transceiver 323 is operable for exchanging signals with the mobile device 21 wirelessly over the Bluetooth link 23. The transceiver 323 is operable, further, for signaling a platform controller 35 in relation to control signals 334 received from the wireless device 21. The transceiver 323 may also signal the mobile device 21, as directed by the platform controller 35.

The platform controller 35 may comprise a microprocessor, microcontroller, programmable logic device (PLD), field-programmable gate array (FPGA), or other integrated circuit (IC) device, such as an application-specific IC (ASIC). The platform controller 35 is operable for controlling the high power laser 11 based on the control signals 334.

Upon the control signals 334 comprising a command to activate the high power laser 11, the platform controller 35 generates a corresponding high power laser trigger signal 37. The trigger signal 37 is operable for activating the high power laser 11.

Upon activation, high power laser 11 is operable for emitting a laser beam at a correspondingly high power intensity level, with which the mobile device 21 may be directed at a scan target. The high power laser beam is emitted from the high power laser 11 through an optical aperture 31. While activated, the high power laser 11 is energized by electrical power 26 from a dedicated battery power source 33. Other components of the high power laser platform 22 are energized, generally, by electrical power 39 from a platform battery general power source 34. The batteries 33 and 34 may be charged or recharged from an electrical charging source while installed within the high power laser platform 22.

An example embodiment may be implemented in which the low power laser 12 is disposed, along with the high power laser 11, in the high power laser platform 22. The platform controller 35 may be operable, further, for generating a corresponding low power laser trigger signal 38. The trigger signal 38 is operable, upon the control signals 334 comprising a corresponding command from the mobile device 21, to activate the low power laser 12. The low power laser beam is emitted from the low power laser 12 through an optical aperture 32. During activation of the low power laser, moreover, an activation of the high power laser 11 is inhibited.

Figure 4:
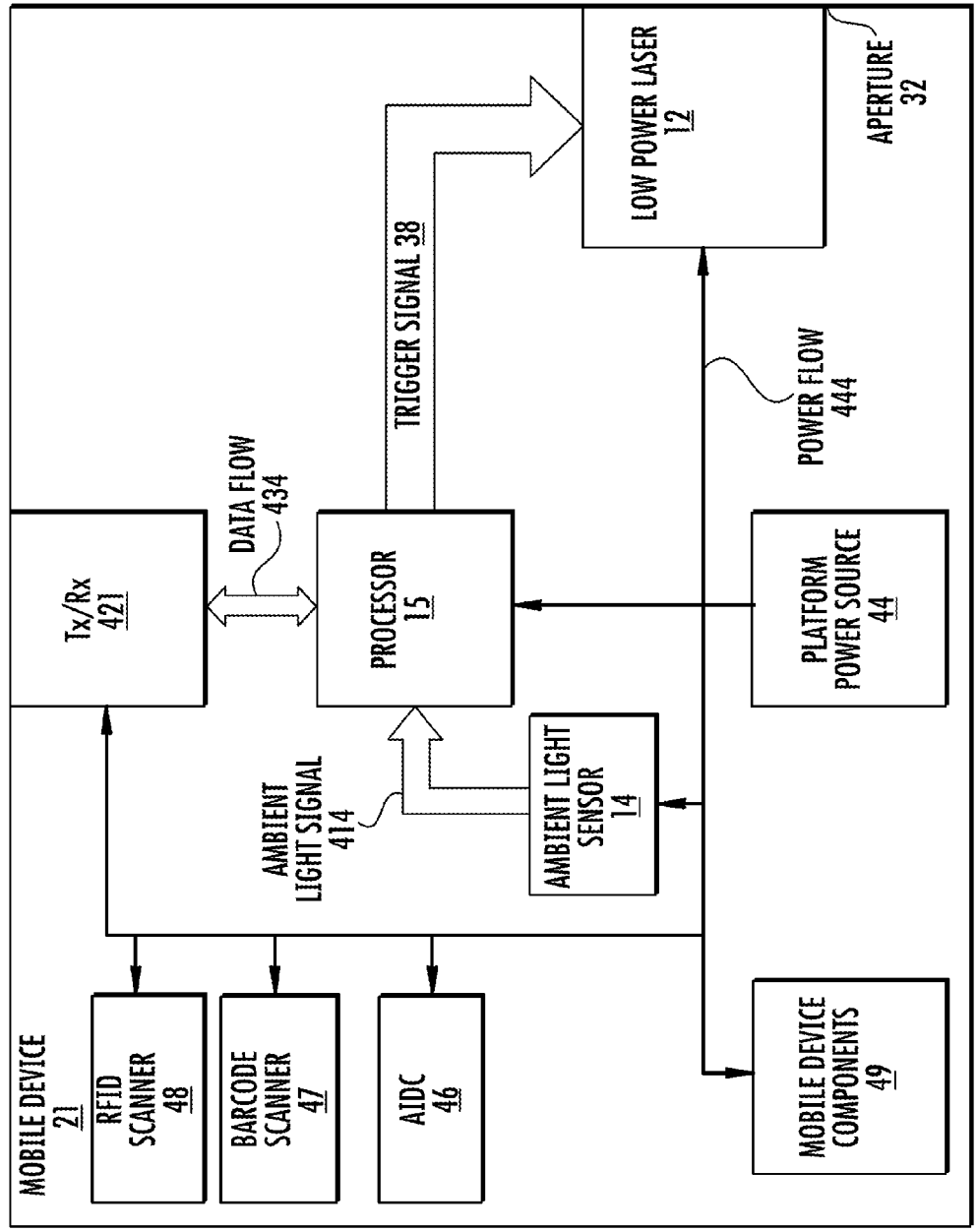
FIG. 4 depicts an example mobile device, according to an embodiment of the present invention.

An example embodiment may be implemented in which the low power laser 12 and the aperture 32 are disposed with the mobile device 21. FIG. 4 depicts an example mobile device 21, according to an embodiment of the present invention. In an example embodiment, the mobile device 21 comprises the processor 15 and the ambient lighting sensor 14, in addition to the low power laser 12.

The mobile device 21 may comprise a PDT. The mobile device may also, or alternatively comprise a handheld or other mobile computer device, such as a pad style or laptop computer, radiotelephone (e.g., smartphone), or a personal digital assistant (PDA), etc.

The mobile device 21 also comprises a transceiver device 421. The transceiver 421 is operable for exchanging signals with the high power laser platform 22 wirelessly over the Bluetooth link 23, as directed by the processor 15. The transceiver 421 is operable, further, for signaling the processor 421, in relation to signals 434 received from the high power laser platform 22.

The light sensor generates signals 414 corresponding to the ambient lighting levels, which may characterize the environment in which the aiming system 10 is used. Responsive to the ambient light sensor 14 generating a signal corresponding to the first detected ambient lighting intensity level, the processor 15 is operable for signaling the high power laser platform 22 via the transceiver 421 to activate the high power laser 11. Responsive to the ambient light sensor 14 generating a signal corresponding to the second detected ambient lighting intensity level, the processor 15 is operable for generating the low power laser trigger signal 38. The low power laser trigger signal 38 is operable for activating the low power laser 12.

Upon activation, the low power laser 12 is operable for emitting a laser beam at a correspondingly low power intensity level, with which the mobile device 21 may be directed at a scan target. The low power laser beam is emitted from the mobile device 21 through an optical aperture 32.

While the low power laser 12 is activated, the processor 15 is operable, further, for inhibiting activation of the high power laser 11. The processor 15 may inhibit the activation of the high power laser 11 by generating and sending a corresponding command, via the transceiver 421, to the high power laser platform 22 over the wireless (e.g., BLE) link 23.

The components of the mobile device 21 may be energized by electrical power 444 from a battery source 44. The battery may be charged or recharged from an electrical charging source while installed within the mobile device 21.

In an example embodiment, the system 10 comprises the mobile device 21 and the high power laser platform 22 coupled communicatively therewith over the wireless link 23. The second laser 12 may comprise a component of the mobile device 21. The second laser 12 may comprise, alternatively, a component of the high power laser platform 22.

The mobile device 21 may comprise components operable in relation to one or more AIDC applications 46. The AIDC components may comprise an RFID scanner 48 and/or a barcode scanner 47. The bar code scanner 47 is operable for performing AIDC functions relating to scanning and reading one-dimensional (1D) graphic data patterns such as "barcodes," and/or two dimensional (2D) graphic data patterns, such as 'Quick Response' (QR) and/or 'Han Xin' matrix code patterns.

Operations of the mobile computing device 21 in relation to the AIDC applications 46 are enabled, at least in part, by aiming the mobile device 21 at a scan target. For example, the aiming of the mobile device 21 aligns the device with the scan target in an orientation that allows the collection of data therefrom. The aiming of the mobile device 21 at the scan target is performed within a use environment in which they are each disposed. The mobile device 21 may be aimed and operated in relation to the AIDC applications 46, and the scan target disposed in various use environments.

Example Use Environments.

The aiming system 10 is operable in various use environments. The use environment may comprise, for example, an outdoor setting, or an indoor setting.

Figure 5A:
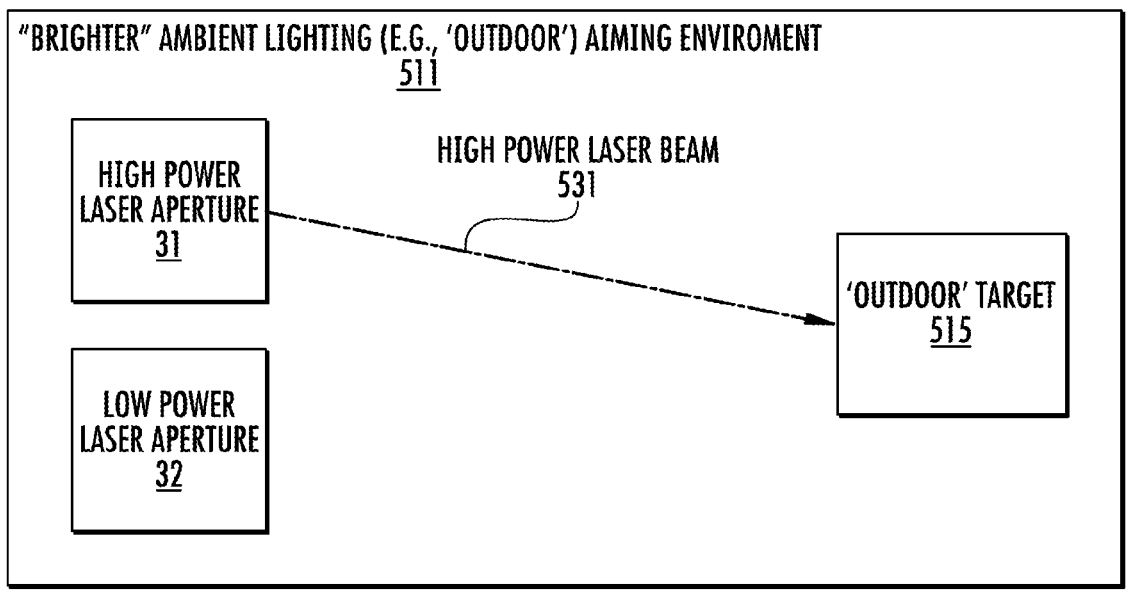
FIG. 5A depicts a first example aiming use, according to an embodiment of the present invention.

FIG. 5A depicts a first example aiming use 510, according to an embodiment of the present invention. The outdoor use setting corresponds to a first aiming environment 511. In the first aiming environment 511, the first ambient lighting intensity level, detected by the ambient lighting detector 14, corresponds to an intensity level characteristic of the outdoor use setting 510.

Figure 5B:
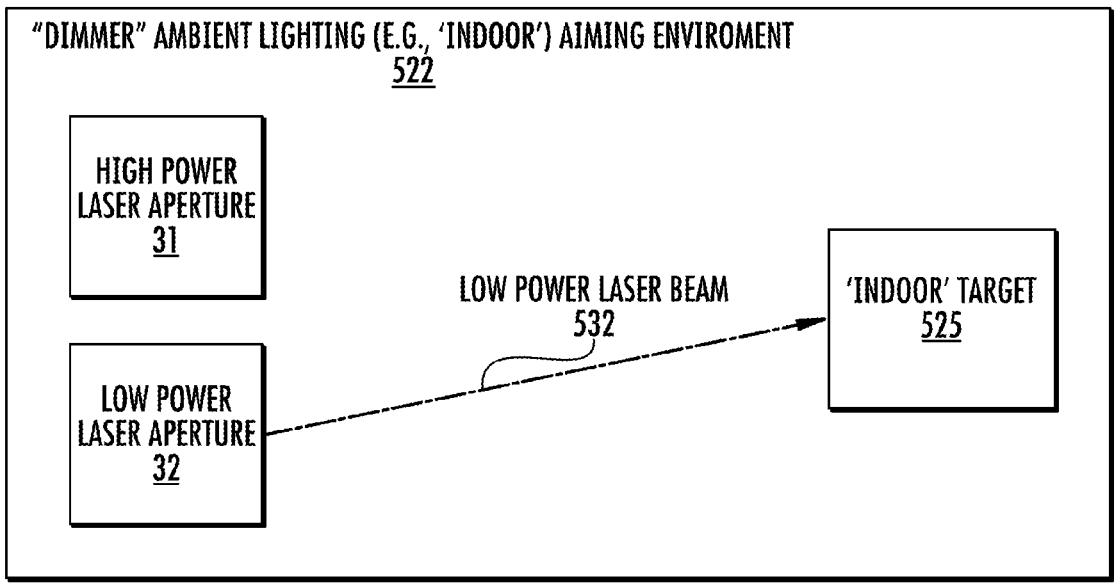
FIG. 5B depicts a second example aiming use, according to an embodiment of the present invention.

FIG. 5B depicts a second example aiming use 520, according to an embodiment of the present invention. The indoor use setting corresponds to a second aiming environment 522. In the second, indoor aiming environment 522, the second ambient lighting intensity level, detected by the ambient lighting detector 14, corresponds to an intensity level characteristic of the indoor use setting 520.

Referring again to FIG. 1 and FIG. 4, the ambient lighting sensor 14 is operable for detecting the intensity level of the ambient lighting of the environment in which the aimer system 10 is used, such as the first use environment 511 and the second use environment. The detection of the ambient lighting intensity level by the ambient lighting sensor may comprise measuring its value.

The ambient lighting intensity value measured in either of the outdoor or indoor use environments may be affected by one or more relevant factors. In relation to the first, outdoor aiming environment 511, the value of the measured ambient lighting intensity may be affected by factors such as a time of day, season, weather (e.g., clear or cloudy skies), geographical latitude, location related characteristics (e.g., shaded or lit, lit naturally or artificially), lighting source characteristics (e.g., sunlight or artificial illumination, quality and quantity of artificial illumination), etc. In relation to the second, indoor aiming environment 522, the value of the measured ambient lighting intensity may be affected by factors such as an availability and attributes (e.g., quantity, quality, and brightness, etc.) of installed lighting, spatial area and volume of the indoor use setting 520, optical characteristics (e.g., specularity, reflectivity, and/or absorbance, etc.) of visibly exposed surfaces (e.g., floors, walls, ceilings, furnishings, finish, coatings etc.) within the indoor use setting 520, etc.

The detection of the intensity level may comprise, further, comparing the measured intensity level with a programmed and/or predetermined threshold value. The detection of the ambient lighting intensity level, and determining the nature of the use environments 511 and 522, may be based on the comparison of the measured intensity level with the threshold value.

Based on determining that the measured intensity level exceeds the programmed and/or predetermined threshold value, it may be determined, in relation to the first aiming use 510, that the environment in which the aimer system 10 is used characterizes the first, outdoor use environment 511. Based on determining that the programmed and/or predetermined threshold value exceeds the measured intensity level exceeds, it may be determined, in relation to the second aiming use 522, that the environment in which the aimer system 10 is used characterizes the second, indoor use environment 511. The outdoor aiming environment 511 may thus be characterized by brighter ambient lighting than that of the indoor use environment 522, and the indoor aiming environment 522 may thus be characterized by dimmer levels ambient lighting than that of the outdoor use environment 511.

In the presence of the relatively brighter ambient lighting characteristic of the first use setting 510, the aiming system 10 may illuminate an outdoor scan target 515 with the high power laser beam 531 emitted from the aperture 31. In the presence of the relatively dimmer ambient lighting characteristic of the second use setting 520, the aiming system 10 may illuminate an indoor scan target 525 with the low power laser beam 532 emitted from the aperture 32. While illuminating the indoor scan target 525 with the low power laser beam 532, emission of a high power laser beam from the aperture 31 may be inhibited.

An example embodiment may be implemented in which the second, low power laser 12 comprises a Class 2 laser device, as classified under the IEC 60825-1 Standard. The low power laser beam 532 comprises a CW power intensity level of 1 mW or less. The first, high power laser 11 emits the high power laser beam 531 at a power intensity level in excess of 1 mW, and thus exceeds the maximum power intensity value specified for compliance with the Class 2 classification under the IEC 60825-1 Standard.

The indoor aiming environment 522 may comprise an interior of a warehouse or shipping distribution center. The indoor use environment 522 may comprise a high population density relative to the outdoor use environment 511. For example, a relatively large number of workers may be present within a relatively small area corresponding to the physical space characterizing the indoor use environment 522. The amount of work performed and the operational tempo thereof in some work areas of the indoor use environment 522, such as those associated with 'order picking' activities within an indoor warehouse use setting, may be associated with especially high worker population densities therein.

With the high worker densities characteristic of the indoor use environment 522, the risk of ocular hazards arising from the use of the low power laser 12 for aiming the mobile device 21 is low; IEC Class 2 laser device are considered safe for use therein. Use of the high power laser beam 531 to aim the mobile device 21 within the densely populated indoor use environment 522 could carry a significantly greater risk of presenting ocular hazards to the workers therein.

The outdoor use setting 511 may comprise, for example, ports, container storage depots, shipyards, trucking lots, and lumber yards. Relative to the indoor use environment 522, the outdoor use environment 511 may be characterized by a lower population density. Fewer workers may be distributed over a larger area corresponding to the physical space characterizing the outdoor use environment 511.

Workers active in the outdoor use environment 511 may perform their work activities while mounted on a forklift, truck, crane, or other vehicle, or a lift platform or bucket disposed therewith. Their work activities may comprise AIDC operations performed on scan targets that may be located at distances from the worker ranging from four (4) feet (approx. 1.22 meters) to 50 feet (approx. 15.24 meters) or more.

In ambient lighting conditions, however, such as the bright sunlight that may characterize the outdoor use environment 511, the visibility of the low power laser beam 532 to the workers may be diminished significantly, relative to its perceptibility indoors. For example, the range of perceptibility of the low power laser beam 532 in the bright sunlight may be constrained to a range of from 12 inches (approx. 0.3 meters) to 18 inches (approx. 0.46 meters), which makes it difficult to use for aiming at the more distant scan targets that may typify the outdoor use environment 511.

To attempt to use the low power laser beam for aiming the mobile device 21 under these circumstances of high ambient light levels, the workers may attempt to shorten the distance to the scan target from the low power laser emission aperture 32. For example, mounted workers may dismount from their work vehicles and approach the scan target on foot. The dismounting, however, may tend to reduce productivity. Moreover, while using the low power laser beam 532 is safe in relation to the risk of presenting an ocular hazard to the workers, the practice of dismounting to effectuate its use in aiming may present other hazards.

For example, dismounting exposes the dismounted workers to other vehicles that may be operating in the area, and which may be fast-moving, slow-stopping, and/or slow-steering. This hazard may be exacerbated by the facts that the attention of the dismounted worker is focused on aiming the mobile device 21 at the scan target with the less visible low power laser beam 532 in the bright ambient lighting conditions, and the attention of the workers is focused on operating the vehicles in which they, themselves, remain mounted.

Example embodiments of the present invention are operable for effectively aiming the mobile device 21 within the indoor use environment 522 using the low power laser beam 532, without a significant risk of presenting an ocular hazard to the workers therein. The example embodiments are also operable for effectively aiming the mobile device 21 within the outdoor use environment 511 using the high power laser beam 531.

The risk of ocular hazard presented by the careful use of the high power laser beam 531 in the outdoor use environment 511 is not excessive. At the same time, using the high power laser beam 531 in the outdoor use environment 511 extends the effective range over which the operator may aim the mobile device 21 at the scan target 515, which obviates the workers dismounting and thus avoids the hazards associated therewith.

Thus, the system 10 is operable for aiming the mobile device 21 within various use settings, and under various ambient lighting conditions. In an example embodiment, the system 10 performs a process for aiming the mobile device 21 at a scan target within the various use settings, and in relation to one or more AIDC operations.

Example Aiming Process.

An example embodiment of the present invention relates to a method for aiming a device at a target within a use environment. FIG. 6A depicts a flowchart of an example process 60 for aiming a device at a target within a use environment, according to an embodiment of the present invention.

In step 61, an intensity level of ambient lighting associated with the use environment is detected.

In step 62, a signal is generated corresponding to the detected ambient lighting intensity level.

In step 63, an emission of a laser beam operable for the aiming of the device is controlled.

Figure 6B:
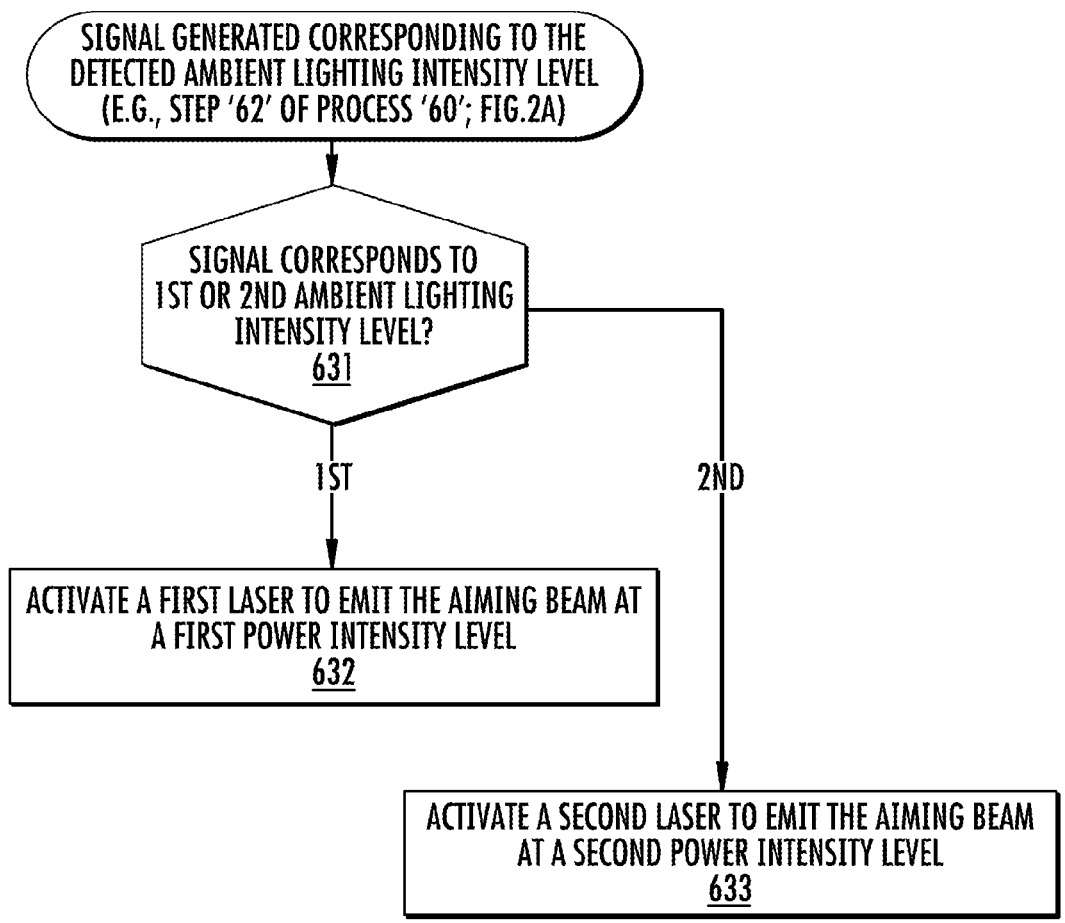
FIG. 6B depicts a flowchart of an example laser aiming beam emission control step, according to an embodiment of the present invention.

FIG. 6B depicts a flowchart of an example of the laser aiming beam emission control step 63 (FIG. 6A), according to an embodiment of the present invention.

In step 631, a determination is made in relation to whether the signal generated in relation to the detected ambient lighting intensity level corresponds to the first, high brightness level of ambient lighting, or to the second, low brightness level of ambient lighting.

If it is determined that the signal generated in relation to the detected ambient lighting intensity level corresponds to the first, high brightness level of ambient lighting, then in step 632, the first, high power laser is activated to emit the aiming beam at the first, high power intensity level.

If it is determined that the signal generated in relation to the detected ambient lighting intensity level corresponds to the second, low brightness level of ambient lighting, then in step 633, the second, low power laser is activated to emit the aiming beam at the second, low power intensity level. The first power intensity level exceeds the second power intensity level. Further, activation of the high power laser is inhibited during the activation of the low power laser.

The use environment may comprise an outdoor setting, in which the first detected ambient lighting intensity level corresponds characteristically thereto. The use environment may comprise an indoor setting, in which the second detected ambient lighting intensity level corresponds characteristically thereto.

The detection of the intensity level may comprise measuring an intensity value characterizing the detected intensity level of the ambient lighting associated with the use environment. The detection of the intensity level may further comprise comparing the measured intensity level with a programmed and/or predetermined threshold value. Based on the comparison of the measured intensity level, the detection of the intensity level may further comprise determining that the measured intensity level exceeds the programmed and/or predetermined threshold value. Based on the comparison of the measured intensity level, the detection of the intensity level may further comprise determining that the programmed and/or predetermined threshold exceeds the value of the measured intensity level.

An example embodiment of the present invention relates to a non-transitory computer-readable storage medium comprising instructions, which when executed by one or more processors causes, configures, controls, or programs a method for aiming a device at a target within a use environment, such as the aiming method 60. The computer-readable storage medium may be associated with a computer platform operable for performing one or more AIDC related functions, which may be directed at a scan target as described herein, for example, by the aiming system 10, and/or aiming process 60.

Example Computer & Network Platform.

Figure 7:
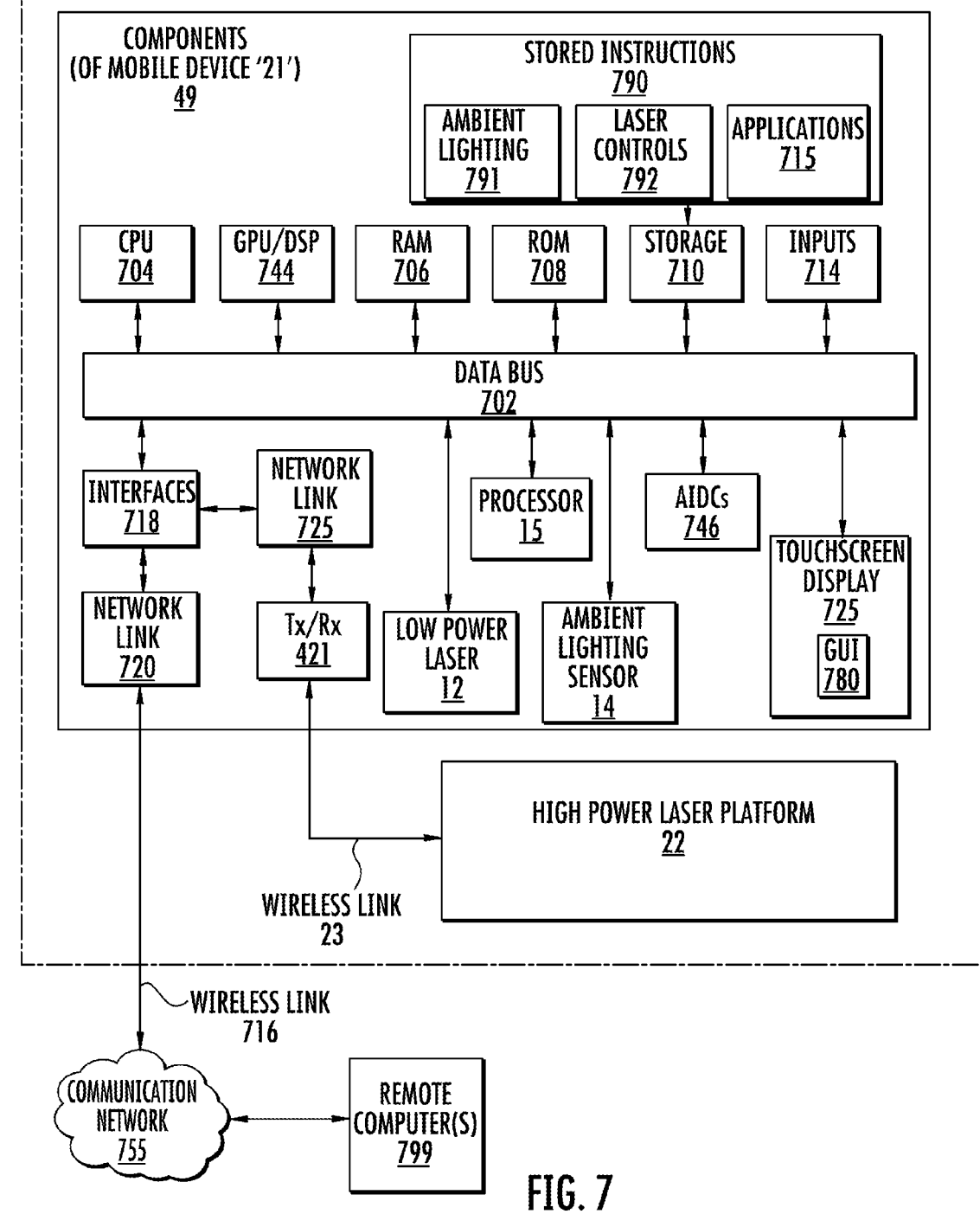
FIG. 7 depicts an example computer and network platform, according to an embodiment of the present invention.

An example embodiment of the present invention relates to a computer platform, which may be disposed in a data communications network. FIG. 7 depicts an example computer and network platform 700, according to an embodiment of the present invention. The network environment 700 comprises a device-related local network 710 and a data communication network 755. The device-related local network 710 comprises the mobile device 21 (shown in the FIG. 7 in relation to a plurality of its components 49) and the high power laser platform 22.

The data communication network 755 may comprise a telephone network and/or a packet-switched data network operable based on transfer control and internetworking protocols (e.g., 'TCP/IP'). The data communication network 755 may comprise a portion of one or more other networks and/or two or more sub-network ("subnet") components. For example, the data communication network 155 may comprise a portion of the internet and/or a particular wide area network (WAN). The data communication network 755 may also comprise one or more WAN and/or local area network (LAN) subnet components. Portions of the data communication network 755 may be operable wirelessly and/or with wireline related means. The data communication network 755 may also comprise, at least in part, a communication network such as a digital telephone network.

The mobile device 21 comprises a plurality of electronic components, each of which is coupled to a data bus 702. The data bus 702 is operable for allowing each of the multiple, various electronic components of the mobile device 21 to exchange data signals with each of the other electronic components. The high power laser platform 22 may also comprise various electronic components (e.g., as shown in FIG. 3).

The electronic components of the mobile device 21, and the high power laser platform 22, may comprise IC devices, including one or more microprocessors. The electronic components of the mobile device 21 and/or the high power laser platform 22 may also comprise other IC devices, such as a microcontroller, FPGA or other PLD or ASIC.

The microprocessors, e.g., of the mobile device 21, comprise the processor 14 and a central processing unit (CPU) 704. The CPU 704 is operable for performing, e.g., general, data processing functions related to operations of the mobile device 21. The electronic components of the mobile device 21 may also comprise one or more other processors 744.

For example, the other microprocessors 744 may comprise a graphics processing unit (GPU) and/or digital signal processor (DSP), which are each operable for performing data processing functions that may be somewhat more specialized than the general processing functions, as well as sometimes sharing some processing functions with the CPU 704.

One of the processors 744 may also be operable as a "math" (mathematics) coprocessor. The math co-processor, DSP and/or GPU ("DSP/GPU") 744 are operable for performing computationally intense data processing. The computationally intense processing operations may relate to AIDC, imaging, graphics, control, and other (e.g., mathematical, financial) information.

The data processing operations comprise computations performed electronically by the CPU 704, and the DSP/GPU 744. The microprocessors may comprise components operable as an arithmetic logic unit (ALU), a floating-point unit (FPU), and associated memory cells. The memory cells comprise non-transitory data storage media, which may be configured as caches (e.g., "L1," "L2"), registers, latches, and/or buffers, etc.

The memory cells are operable for storing data electronically in relation to various functions of the processors. For example, a translational look-aside buffer (TLB) may be operable for optimizing efficiency of use of content-addressable memory (CAM) by the CPU 704, and/or the DSP/GPU 744, etc.

The mobile device 21 also comprises non-transitory computer readable storage media operable for storing data physically, such as by mechanisms operable electronically, optically, magnetically, and/or electromagnetically. For example, the computer readable storage media comprises a main memory 706, such as a random access memory (RAM) or other dynamic storage medium. The main memory 706 is coupled to data bus 702 for storing information and instructions, which are to be executed by the CPU 704.

The main memory 706 may also be used for storing temporary variables or other intermediate information during execution of instructions by the CPU 704. Other memories (represented in the present description with reference to the RAM 706) may be installed for similar uses by the processor 15 and the DSP/GPU 744.

The mobile device 21 further comprises a read-only memory (ROM) 708 or other static storage medium coupled to the data bus 702. The ROM 708 is operable for storing static information and instructions for use by the CPU 704.

In addition to the RAM 706 and the ROM 708, the non-transitory storage media may comprise at least one data storage device 710. The data storage device 710 is operable for storing information and instructions and allowing access thereto.

The data storage device 710 may comprise a magnetic disk drive, flash drive, or optical disk drive (or other non-transitory computer readable storage medium). The data storage device 710 comprises non-transitory media coupled to data bus 702, and may be operable for providing a "virtual memory" function. The virtual memory operations of the storage device 710 may supplement, at least temporarily, storage capacity of other non-transitory media, such as the RAM 706.

The non-transitory storage media comprises instructions 783, which are stored physically, (e.g., electronically, optically, magnetically, electromagnetically, etc.) in relation to software for programming, controlling, and/or configuring operations of the mobile device 21 and its components 49 and applications, including one or more AIDC applications 746. The instructions 783 may also relate to the performance of one or more steps of the aiming method 60 (FIG. 6A; 6B).

Instructions, programming, software, settings, values, and configurations, etc. related to the method 60, the system and its components, and other operations of the mobile device 21 and the high power laser platform 22 are stored physically by the storage medium 710, memory, etc.

The stored instructions 790 may comprise information related to a suite of applications 715 related to one or more operations of the mobile device 710, including operations related to the AIDC component 746. The stored instructions 710 may comprise information 791 related to controlling the lasers 11 and 12, and to setting thresholds and computing measurements related to operations of the ambient lighting sensor 14.

The computer 701 may comprise a user-interactive display configured as the touchscreen 725, which is operable as a combined display and a graphic user interface (GUI) 780. The touchscreen 725 may comprise a liquid crystal display (LCD), which is operable for rendering images by modulating variable polarization states of an array of liquid crystal transistor components. The GUI 780 comprises an interface, operable over the touchscreen display 725, for receiving haptic inputs from a user of the mobile device 21.

The haptic interface of the GUI 780 and touchscreen 725 may comprise, e.g., at least two arrays of microscopic (or transparent) conductors, each of which is insulated electrically from the other and disposed beneath a transparent surface of the display 725 in a substantially perpendicular orientation relative to the other. The haptic inputs comprise pressure applied to the surface of the GUI 780 on the touchscreen 725, which cause corresponding local changes in electrical capacitance values proximate to the pressure application that are sensed by the conductor grids. The localized capacitance changes are operable for effectuating a signal corresponding to the input.

The touchscreen 725 may be implemented operably for rendering images over a heightened (e.g., high) dynamic range (HDR). The rendering of the images may also be based on modulating a back-light unit (BLU). For example, the BLU may comprise an array of light emitting diodes (LEDs). The LCDs may be modulated according to a first signal and the LEDs of the BLU may be modulated according to a second signal. The touchscreen 725 may render an HDR image by coordinating the second modulation signal in real time, relative to the first modulation signal.

Other display technologies may also (or alternatively) be used. For example, the display 725 may comprise an organic LED (OLED) array. The display 725 may also (or alternatively) comprise a display operable over a standard dynamic range (SDR), sometimes also referred to as a "low dynamic range" (LDR).

An input receiver 714 may comprise one or more electromechanical switches, which may be implemented as buttons, escutcheons, microelectromechanical sensors (MEMS) or other sensors, dual in-line package (DIP) switches, dials, etc. The input receiver 714 may also comprise cursor and trigger controls such as a mouse, haptically-actuated touchpad, and/or keyboard. The keyboard may comprise an array of alphanumeric and/or ideographic, character-related, or syllabary based keys operable for typing corresponding letters, number, and/or other symbols. The keyboard may also comprise an array of directional (e.g., "up/down," "left/right") keys, operable for communicating commands and data selections to the CPU 704 and for controlling movement of a cursor rendering over the touchscreen display 725.

The directional keys may be operable for presenting two degrees of freedom of a cursor, over at least two perpendicularly disposed axes presented on the display component of the touchscreen 725. A first 'x' axis is disposed horizontally. A second 'y' axis, complimentary to the first axis, is disposed vertically. Thus, the printing evaluation system 700 is thus operable for specifying positions over a representation of a Cartesian geometric plane, and/or other coordinate systems.

Execution of instruction sequences contained in the storage media 710 and main (and/or other) memory 706 cause the CPU 704 to perform processing related to general and other operations of the mobile device 21, and the DSP/GPU 744, to perform various other processing operations, including processing steps related to the example method 60 (FIG. 6A; 6B). Additionally or alternatively, hard-wired circuitry may be used in place of, or in combination with the software instructions. Thus, the mobile device 21 is not limited to any specific combination of circuitry, hardware, firmware, or software.

The term "computer readable storage medium," as used herein, may refer to any non-transitory storage medium that participates in providing instructions to the various processor components of the mobile device 21 for execution. Such a medium may take various forms including, but not limited to, non-volatile media, volatile media, and transmission media. Non-volatile media comprises, for example, configured/programmed active elements of the CPU 704, the DSP/GPU 744, stored instructions 783, and other optical, electronic, or magnetic media. Volatile media comprises dynamic memory associated, e.g., with the RAM 706.

Transmission media comprises coaxial cables, copper wire and other electrical conductors and fiber optics, including the wires (and/or other conductors or optics) that comprise the data bus 702.

Transmission media can also take the form of electromagnetic radiation (e.g., light waves), such as may be generated at RF wavelengths, and infrared (IR) and other optical frequencies. Data communications may also be effectuated using other means, including acoustic (e.g., sound related) or other mechanical, vibrational, or phonon related media.

Non-transitory computer-readable storage media may comprise, for example, flash drives such as may be accessible via universal serial bus (USB) or any medium from which the mobile device 21 can access, read, receive, and retrieve data.

Various forms of non-transitory computer readable storage media may be involved in carrying one or more sequences of one or more instructions to CPU 704 for execution. For example, the instructions may initially be carried on a magnetic or other disk of a remote computer (e.g., computers 799). The remote computer can load the instructions into its dynamic memory and send the instructions over the network 155.

The mobile device 21 can receive the data over the network 155 and use an RF, IR, or other transmitter means to convert the data to corresponding signals. An IR, RF or other signal detector or receiver coupled to the data bus 702 can receive the data carried in the corresponding signals and place the data on data bus 702. The operations associated with the transmitter and the receiver may be combined in a transceiver. The transmitter, receiver, and/or transceiver may be associated with the interfaces 718.

The data bus 702 carries the data to main memory 706, from which CPU 704 and the DSP/GPU 744 retrieve and execute the instructions. The instructions received by main memory 706 may optionally be stored on storage device 710 either before or after execution by CPU 704.

The interfaces 718 may comprise a communication interface coupled to the data bus 702. The communication interface 718 is operable for providing a two-way (or more) data communication coupling to a network link 720, which may connect wirelessly over RF to the network 155.

In any implementation, the communication interface 718 sends and receives electromagnetic, optical, and/or electrical signals that carry digital data streams representing various types of information. The network link 720 provides data communication through the network 755 to other data devices. Wireless communication may also be implemented optically, e.g., at IR frequencies. The interfaces 718 may provide signals to the components of the mobile device 21 via the network link 720 received over the data communications network 155. The data communications network 155 and associated RF links may be operable over one or more radiotelephone frequency bands and using code-division multiple access (CDMA), Global System for Mobile (GSM), time-division multiple access (TDMA), frequency-division multiple access (FDMA), and/or other modulation approaches, including combinations of, e.g., CDMA, etc. and one or more other modulation approaches.

The communication interface 718 is also operable for providing a two-way (or more) data communication coupling to a network link 725, which may connect wirelessly over RF, via the device-related local network 710, to the high power laser platform 22 (as well as peripheral devices, if used).

The network link 725 may couple communicatively to the high power laser platform 22 via the device-related local network 710 over the wireless link 23. The wireless link 23 may comprise a Bluetooth link, which is operable at a frequency of approx. 2.4 GHz to 2.485 GHz in an ISM band of the RF spectrum. The Bluetooth link 23 may comprise a BLE link. The mobile device 21 may be operable for controlling the high power laser platform 22 using commands transmitted over the BLE link 23. An example embodiment may also, or alternatively, be implemented in which the network link 23 comprises a portion characterized by at least one wireline medium.

The network 155 and the device-related local network 710 may use one or more of electrical, electromagnetic, and/or optical signals carrying digital data streams. The system 100 can send messages and receive data, including program code, through the network 755, network link 720, and the communication interface 718.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;

U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Patent No. D716,285;
U.S. Design Patent No. D723,560;
U.S. Design Patent No. D730,357;
U.S. Design Patent No. D730,901;
U.S. Design Patent No. D730,902;
U.S. Design Patent No. D733,112;
U.S. Design Patent No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;

U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;

U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTI-PURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTI-FUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HAND-HELD DIMENSIONER WITH DATA-QUALITY INDICATION filed Oct. 21, 2014 (Laffargue et al.);
U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);
U.S. patent application Ser. No. 14/535,764 for CONCATENATED EXPECTED RESPONSES FOR SPEECH RECOGNITION filed Nov. 7, 2014 (Braho et al.);
U.S. patent application Ser. No. 14/568,305 for AUTO-CONTRAST VIEWFINDER FOR AN INDICIA READER filed Dec. 12, 2014 (Todeschini);
U.S. patent application Ser. No. 14/573,022 for DYNAMIC DIAGNOSTIC INDICATOR GENERATION filed Dec. 17, 2014 (Goldsmith);
U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

Example embodiments of the present invention are thus described in relation to methods and systems for aiming a device at a target within a use environment. An intensity level of ambient lighting associated with the use environment is detected and a corresponding signal is generated. An emission of a beam operable for the aiming of the device is controlled. Upon the generated signal corresponding to a first detected ambient lighting intensity level, a first laser is activated to emit the aiming beam at a first power intensity level. Upon the generated signal corresponding to a second detected ambient lighting intensity level, which exceeds the second detected ambient lighting intensity level, a second laser is activated to emit the aiming beam at a second power intensity level. The first power intensity level exceeds the second power intensity level.

Example embodiments of the present invention thus provide for conducting AIDC operations with mobile devices efficiently on scan targets in various use environments. In relation to the AIDC operations, the example embodiments aim the mobile devices with a laser in each of the various use environments, whether indoor or outdoor, and under differing ambient lighting intensity conditions associated each therewith. Further, example embodiments provide for the perceptibility of the laser beams, with which the mobile device is aimed in relation to the AIDC operations, safely.

For clarity and brevity, as well as to avoid unnecessary or unhelpful obfuscating, obscuring, obstructing, or occluding features of an example embodiment, certain intricacies and details, which are known generally to artisans of ordinary skill in related technologies, may have been omitted or discussed in less than exhaustive detail. Any such omissions or discussions are neither necessary for describing example embodiments of the invention, nor particularly relevant to understanding of significant elements, features, functions, and aspects of the example embodiments described herein.

In the specification and/or figures, typical embodiments of the invention have been disclosed. The present invention is not limited to such example embodiments. The use of the term "and/or" includes any and all combinations of one or more of the associated listed items, and the term "or" is used in an inclusive (and not exclusive) sense. The drawing figures comprise schematic representations and thus, are not

What is claimed, is:

1. A method for aiming a device at a target within a use environment, the method comprising the steps of:
   detecting an intensity level of ambient lighting associated with the use environment;
   generating a signal corresponding to the detected ambient lighting intensity level; and
   controlling an emission of a beam operable for the aiming of the device, wherein:
   upon the generated signal corresponding to a first detected ambient lighting intensity level, the controlling of the emission comprises activating a first laser to emit the aiming beam at a first power intensity level; and
   upon the generated signal corresponding to a second detected ambient lighting intensity level, wherein the first detected ambient lighting intensity level exceeds the second detected ambient lighting intensity level, the controlling of the emission comprises activating a second laser to emit the aiming beam at a second power intensity level, wherein the first power intensity level exceeds the second power intensity level.

2. The method as described in claim 1 wherein the use environment comprises an outdoor setting, wherein the first detected ambient lighting intensity level corresponds to the outdoor setting.

3. The method as described in claim 1 wherein the use environment comprises an indoor setting, wherein the second detected ambient lighting intensity level corresponds to the indoor setting.

4. The method as described in claim 1 wherein the step of detecting of the intensity level comprises measuring an intensity value characterizing the detected intensity level of the ambient lighting associated with the use environment.

5. The method as described in claim 4 wherein the step of detecting of the intensity level further comprises comparing the measured intensity level with a programmed or predetermined threshold value.

6. The method as described in claim 5 wherein, based on the comparison of the measured intensity level, the step of detecting of the intensity level further comprises determining that the measured intensity level exceeds the programmed or predetermined threshold value.

7. The method as described in claim 5 wherein, based on the comparison of the measured intensity level, the step of detecting of the intensity level further comprises determining that the programmed or predetermined threshold exceeds the value measured intensity level.

8. A non-transitory computer-readable storage medium comprising instructions, which when executed by one or more processors causes, configures, controls, or programs a method for aiming a device at a target within a use environment, the aiming method comprising the steps of:
   detecting an intensity level of ambient lighting associated with the use environment;
   generating a signal corresponding to the detected ambient lighting intensity level; and
   controlling an emission of a beam operable for the aiming of the device, wherein:
   upon the generated signal corresponding to a first detected ambient lighting intensity level, the controlling of the emission comprises activating a first laser to emit the aiming beam at a first power intensity level; and
   upon the generated signal corresponding to a second detected ambient lighting intensity level, wherein the first detected ambient lighting intensity level exceeds the second detected ambient lighting intensity level, the controlling of the emission comprises activating a second laser to emit the aiming beam at a second power intensity level, wherein the first power intensity level exceeds the second power intensity level.

9. A system for aiming a device disposed in a use environment, the system comprising:
   a sensor operable for detecting an intensity level of ambient lighting associated with the use environment, and for generating a signal corresponding to the detected ambient lighting intensity level;
   a first laser operable for emitting a first aiming beam, the first aiming beam comprising a first power intensity level;
   a second laser operable for emitting a second aiming beam, the second aiming beam comprising a second power intensity level, wherein the first power intensity level exceeds the second power intensity level; and
   a processor operable for responding to the generated signal, wherein:
   upon the generated signal corresponding to a first detected ambient lighting intensity level, for activating the first laser to emit the first aiming beam; and
   upon the generated signal corresponding to a second detected ambient lighting intensity level, wherein the first detected ambient lighting intensity level exceeds the second detected ambient lighting intensity level, for activating the second laser to emit the second aiming beam.

10. The system as described in claim 9 wherein the use environment comprises one or more of:
    an outdoor setting, wherein the first detected ambient lighting intensity level corresponds to the outdoor setting;
    or an indoor setting, wherein the second detected ambient lighting intensity level corresponds to the indoor setting.

11. The system as described in claim 9 wherein the detection of the intensity level comprises measuring an intensity value characterizing the detected intensity level of the ambient lighting associated with the use environment.

12. The system as described in claim 11 wherein the detection of the intensity level further comprises comparing the measured intensity level with a programmed or predetermined threshold value.

13. The system as described in claim 12 wherein, based on the comparison of the measured intensity level, the detection of the intensity level of the ambient lighting level further comprises at least one of:
    determining that the measured intensity level exceeds the programmed or predetermined threshold value; or
    determining that the programmed or predetermined threshold value exceeds the measured intensity level.

14. The system as described in claim 9 wherein the second laser comprises a Class 2 laser device, as classified in relation to a standard of the International Electrotechnical Commission (IEC) standards authority, the standard comprising 'IEC 60825-1'.

15. The system as described in claim 9 wherein the first power intensity level of the first laser exceeds one or more of:
    a maximum power intensity value specified for compliance with a Class 2 classification under the 'IEC 60825-1' Standard of the International Electrotechnical Commission (IEC) standards authority; or one Milliwatt (1 mW), continuous wave (CW), at one or more wavelengths disposed over the range of 400 to 700 nanometers (400-700 nm), inclusive.

16. The system as described in claim 9, further comprising:
   a mobile device; and
   a platform coupled communicatively with the mobile device and comprising the first laser, wherein the second laser comprises a component of at least one of the platform or the mobile device.

17. The system as described in claim 16 wherein the device aimed by the system and disposed in the use environment comprises the mobile device.

18. The system as described in claim 16 wherein the device comprises one or more applications operable for performing at least one automatic identification and data capture (AIDC) related function, wherein the AIDC function is operable, at least in part, based on aiming the mobile device with at least one of the first aiming beam or the second aiming beam.

* * * * *